(No Model.)  2 Sheets—Sheet 1.

W. WILKES.
WHEEL HARROW.

No. 359,339. Patented Mar. 15, 1887.

WITNESSES
Edwin L. Bradford
Jos. H. Hunter

INVENTOR
Washington Wilkes,
By Morton Toulmin,
his Attorney (No Model.) 2 Sheets—Sheet 2.
W. WILKES.
WHEEL HARROW.
No. 359,339. Patented Mar. 15, 1887.
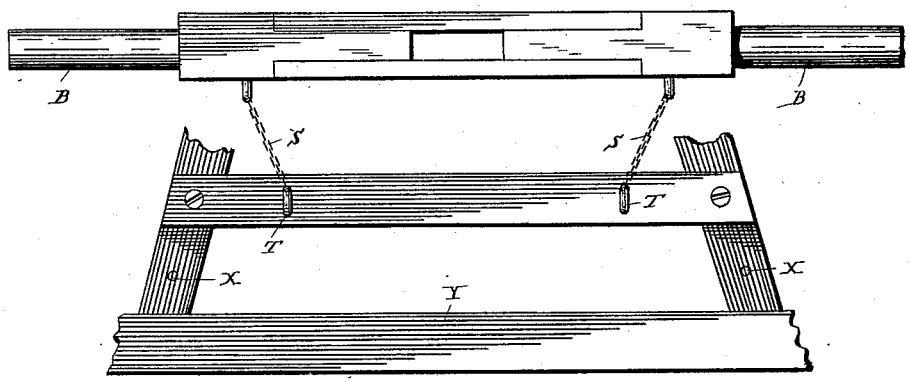
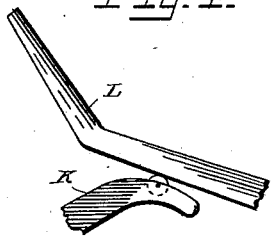
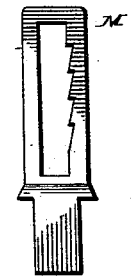
WITNESSES
Edwin L. Bradford
Jos. H. Hunter
INVENTOR
Washington Wilkes,
By Morton Toulmin,
his Attorney

UNITED STATES PATENT OFFICE.

WASHINGTON WILKES, OF SYLACAUGA, ALABAMA.

WHEEL-HARROW.

SPECIFICATION forming part of Letters Patent No. 359,339, dated March 15, 1887.

Application filed December 1, 1886. Serial No. 220,360. (No model.)

*To all whom it may concern:*

Be it known that I, WASHINGTON WILKES, a citizen of the United States, residing at Sylacauga, in the county of Talladega and State of Alabama, have invented certain new and useful Improvements in Wheel-Harrows, of which the following is a specification, reference being had therein to the accompanying drawings.

This invention relates to certain new and useful improvements in wheel-harrows; and the invention consists in mounting upon a supporting-axle a riding-frame, upon which the operator is seated, and upon which is also mounted mechanism for elevating the harrow from the ground when it is desired to move the machine without harrowing.

The invention further consists in also mounting upon the axle an intermediate frame, to which the harrow-frame is flexibly yet adjustably attached, whereby the harrow is given the proper inclination with respect to the ground, so as to prevent its forward end from a tendency to enter too deeply, and so as to permit that end to readily ride over obstructions.

The invention further consists in securing to the intermediate frame, just forward of the supporting-wheels, a grading hoe or shovel at either side for the purpose of cutting away the earth to a uniform depth, and forming tracks into which the wheels will run, and which, being uniform and free of elevated places, will prevent the wheels from lifting the harrow above some lower intermediate part of the ground.

The invention still further consists in providing the harrow with cutting and pulverizing teeth arranged so that the pulverizing-teeth will travel between the lines of travel of the cutting-teeth, and thereby act upon and crush the sod left between said lines.

Figure 1:
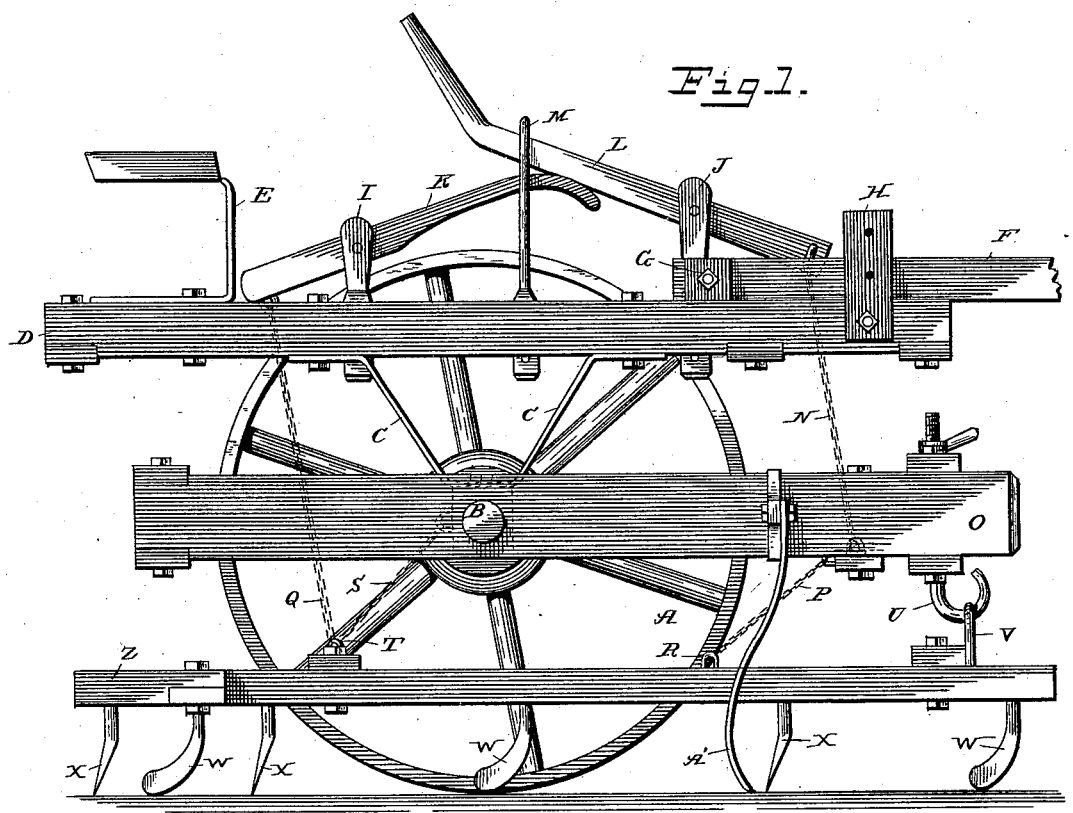
Figure 2:
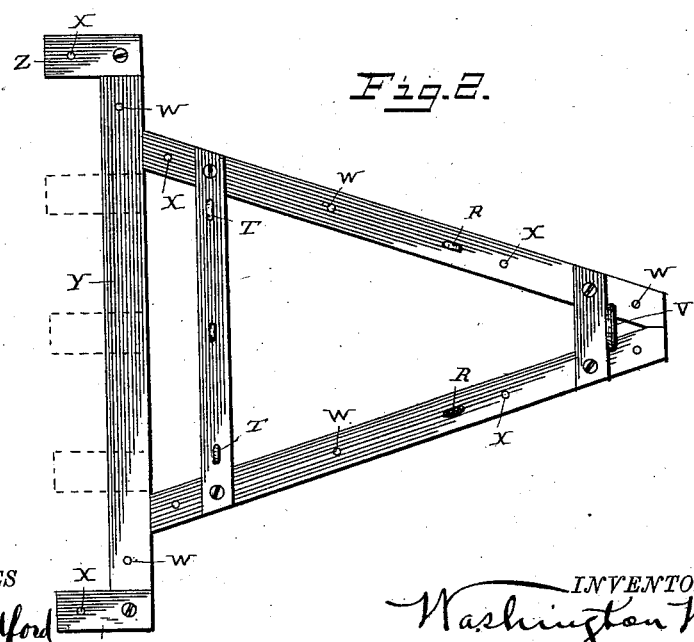

In the accompanying drawings, forming a part of this specification, and on which similar letters of reference indicate the same or corresponding features, Figure 1 represents a side elevation of my improvement in wheel-harrows; Fig. 2, a plan view of the harrow-frame detached; Fig. 3, a plan view of the axle and a portion of the harrow-frame, showing the arrangement of the chains which prevent too much lateral sway of the harrow; Fig. 4, a detached view of the operating-levers, showing an anti-friction roller between them; and Fig. 5, a view of the standard with the rack-teeth.

The letter A designates a supporting-wheel, of which there are two, one at either side; and B, an axle, to which are secured standards C, one at either side. Upon these standards is mounted the riding-frame D, which may be of any approved construction, and which carries a seat, E, and is provided at its forward end with a tongue or with shafts F. These shafts are pivoted to the frame D in clips G, and are guided by bands H, which extend above the shafts somewhat, and have a series of holes in them, so as to fix the shafts at different heights to suit different size animals, pins being passed through the bands and shafts. In standards I and J are levers K and L, the latter being a hand-lever. These levers pass through a vertically-slotted standard, M, having rack-teeth, as seen in Fig. 5, whereby the hand-lever is locked in any adjusted position, and the lever K secured, for a purpose presently to appear.

From the forward end of the lever L two chains, N, extend and branch out laterally and connect with a cross-beam near the forward end of the intermediate frame, O, also presently to be described. These chains, it will be observed, lift the forward end of the frame O when the hand end of the lever L is depressed, and in being lifted the frame O elevates the forward end of the harrow. From the lever K extends another chain, Q, which connects, not with the frame O, as the chains N do, but with the harrow-frame near the rear end of the latter. By this means that end of the harrow is elevated at the same time and by the same operation as the forward end of the harrow is elevated. This mechanism, it should be noted, constitutes the means of raising and lowering the harrow from and to the ground.

The means of connecting the harrow with the running-gear, so that it will advance with it, may of course be more or less varied, but preferably consists of chains P, connected with a cross-beam of the frame O and with the side beams of the harrow at R, and also of the chains S, connected with the axle, as shown in dotted lines in Fig. 1, and with a cross-beam at T of the harrow-frame. These chains S are connected with the axle at a greater distance apart than the point of their connection with the harrow, as seen in Fig. 3, whereby they serve as well to prevent the harrow from swinging too far laterally in either direction as to connect it with the running-gear and make it follow the same.

An adjustable eyebolt, U, is mounted in the forward end of the frame O, and is engaged by a staple, V, of the harrow, by which means the harrow is adjusted at its forward end up and down and its teeth allowed to descend more or less into the ground. I find by adjusting the harrow slightly higher at the forward end than at the rear it will ride over obstructions which would otherwise make it difficult to pass. The connection between the staple V and the eyebolt U is such as to allow the harrow to move rearwardly the extent of the length of the slack of the chains P and S.

The harrow-teeth are of two kinds, those designated by W being sod-cutting, and the teeth designated by X sod-pulverizing. As seen in Fig. 2, the teeth X will be observed to stand between the lines cut by the teeth W, the result of which is, that the earth left between the cuts made by the cutting-teeth is broken or more or less pulverized by the pulverizing-teeth.

The harrow-frame is preferably of V shape, and is designed to be constructed at its rear end with a cross-beam, Y, extended laterally beyond the harrow-frame proper and provided with additional beams, Z, by preference parallel to each other and carrying one or more of the cutting or pulverizing teeth.

When harrowing flat ground—that is, in a field where no furrows have been thrown up—a greater number of the beams Z are attached to the beam Y, as shown in dotted lines in Fig. 2.

It should be noted that the lever K is curved and fitted against the under side of the lever L, and the two slide upon each other when elevated and depressed. An anti-friction roller might be carried upon the lever K, if desired, as indicated in Fig. 4.

The letter A' designates the hoes or shovels, which stand in front of the wheels, and are secured to the frame O in any convenient manner, and at their lower ends occupy about the same plane as the periphery of the wheels. The object of these hoes is to cut through any slight or abrupt elevations of earth or to throw aside any pieces over which the wheels might otherwise ride and tend to raise the harrow from its work.

Over this harrow the operator can exercise a perfect control, and the various kinds of harrowing can all be done.

Having thus fully described my invention, what I claim as new, and desire to secure by Letters Patent, is—

1. In a wheel-harrow, the combination, with the supporting-wheels, the axle, and the riding-frame mounted thereon and carrying adjusting-levers, of the intermediate frame carried by the axle and connected with one of said levers and the harrow-frame connected with the intermediate frame and with the other of said levers.

2. In a wheel-harrow, the combination, with the axle, the supporting-wheels, the riding-frame having a pole or shafts, and the adjusting-levers arranged so that by operating one the other is also operated, of the intermediate frame mounted on the axle and connected with one of said levers, and the harrow-frame flexibly connected with the intermediate frame, and also adjustably connected therewith at its forward end, and further connected with the other of said levers.

3. In a wheel-harrow, the combination, with the supporting-wheels and the riding-frame mounted thereon and carrying two adjusting-levers which engage each other, of the intermediate frame carried by the axle and connected with one of said levers, and the harrow-frame connected with the intermediate frame and with the other of said levers, whereby one lever is operated by operating the other lever, and a toothed standard to lock the levers.

In testimony whereof I affix my signature in presence of two witnesses.

WASHINGTON WILKES.

Witnesses:
 DAVID M. OLIVER,
 EDWIN L. BRADFORD.